US012570147B2

(12) United States Patent
Papp

(10) Patent No.: US 12,570,147 B2
(45) Date of Patent: Mar. 10, 2026

(54) METHOD FOR SIMULTANEOUSLY PERFORMING VEHICLE AND SMARTPHONE FUNCTIONS USING A HARD KEY ON VEHICLE

(71) Applicant: Dr. Ing. h.c. F. Porsche Aktiengesellschaft, Stuttgart (DE)

(72) Inventor: Ethan Papp, Union City, CA (US)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 192 days.

(21) Appl. No.: 18/444,885

(22) Filed: Feb. 19, 2024

(65) Prior Publication Data

US 2025/0262932 A1 Aug. 21, 2025

(51) Int. Cl.
B60K 35/10 (2024.01)
B60K 35/22 (2024.01)
B60W 50/00 (2006.01)
G07C 9/00 (2020.01)

(52) U.S. Cl.
CPC .............. B60K 35/10 (2024.01); B60K 35/22 (2024.01); B60W 50/0098 (2013.01); G07C 9/00309 (2013.01)

(58) Field of Classification Search
CPC ... B60K 35/10; B60K 35/22; B60W 50/0098; G07C 9/00309
See application file for complete search history.

(56) References Cited

U.S. PATENT DOCUMENTS

2015/0134141 A1* 5/2015 Park ...................... B60W 50/08
701/1
2023/0202498 A1 6/2023 Aksyutina et al.

FOREIGN PATENT DOCUMENTS

DE 102018006957 A1 2/2019
DE 102019207750 A1 12/2020

* cited by examiner

*Primary Examiner* — Yuen Wong
(74) *Attorney, Agent, or Firm* — Buchanan Ingersoll & Rooney PC

(57) ABSTRACT

A computer-implemented method and computer program product for simultaneously controlling vehicle functions and mobile device functions. The method includes the steps of: (a) connecting a mobile software application to an in-vehicle network; (b) configuring, in the mobile software application, a plurality of user-configurable functions, at least one first user-configurable function being associated with at least one vehicle function of a plurality of vehicle functions and at least one second user-configurable function being associated with an operation external to the vehicle that is performed by the mobile software application; and (c) controlling each of the at least one first and second user-configurable functions simultaneously with a hard key arranged within a vehicle interior. The computer program is configured to perform the aforementioned steps.

13 Claims, 4 Drawing Sheets

400

410 — Connect mobile device to vehicle

412 — Launch App

414 — Display vehicle functions and external functions

416 — Configure vehicle functions and external functions

418 — Present information about configured vehicle functions and external functions 420 — Controlling simultaneously vehicle functions and external functions

METHOD FOR SIMULTANEOUSLY PERFORMING VEHICLE AND SMARTPHONE FUNCTIONS USING A HARD KEY ON VEHICLE

TECHNICAL FIELD

The present subject matter relates to a system and method for simultaneously performing vehicle and mobile device (e.g., smartphone) functions using a single hard key within the vehicle interior.

BACKGROUND

The modern automobile in recent years has seen a massive expansion in the number of internal electronic control and driving assistance systems. The use of mobile and wearable electronic devices also continues to increase. Most automobiles are capable of communicating with a smartphone carried by, or a smartwatch worn by, a driver or a passenger in the vehicle. For example, a smartphone is configured to communicate with an Apple CarPlay software system within the vehicle. With the rapid development of mobile technologies, users have higher demands for the convenience of use of in-vehicle control systems and software applications (e.g., "apps"). Currently, users can either use an original in-vehicle application provided by the vehicle manufacturer or connect a smartphone to the vehicle onboard computer, and then project an app installed on the smartphone onto the vehicle display screen through Apple CarPlay, Android Auto, CarLife, or other software connectivity protocols.

As is described in U.S. patent application Ser. No. 18/219,933, which is incorporated by reference herein in its entirety, vehicle functions (e.g., vehicle audio and video, vehicle window control, climate control, vehicle lighting, etc.) are integrated within the CarPlay app to create an innovate, personalized experience for the vehicle driver and passengers. Accordingly, the driver and passengers can control various in-vehicle functions via a connected smartphone because the smartphone is connected to the in-vehicle CarPlay app, the CarPlay app is integrated within the vehicle infotainment system, and the vehicle infotainment system is interconnected with the in-vehicle network of controllers, sensors and computers.

Existing in-vehicle electronic control systems do not offer much flexibility in terms of simultaneous control of multiple functions related to the operation of the vehicle and apps on the smartphone unrelated to the operation of the vehicle. For example, drivers or passengers of a vehicle may prefer to simultaneously perform multiple vehicle functions and smartphone functions that are unrelated to the vehicle, such as, for example: activating a specific driving mode, controlling the window shades in the vehicle, locking the house front door, checking whether the house front door is locked, sending a text message, etc. However, existing in-vehicle electronic control systems do not interact with the smartphone such that the vehicle electronic control system can also control an app on the smartphone to perform a specific "external" function that is unrelated to operation of the vehicle (e.g., locking the house door). And, smartphones are typically unable to control vehicle functions.

Described herein is a system which can allow the user of a vehicle to configure and simultaneously control multiple in-vehicle functions as well as functions performed by a smartphone that are unrelated and external to the vehicle, thereby enhancing the in-vehicle user experience, without much effort or distraction from driving.

SUMMARY OF INVENTION

Described herein are a method and a computer program product for enabling simultaneous control of multiple vehicle functions and mobile device functions, thereby enhancing the user's in-vehicle experience. The method includes the steps of: (a) connecting a mobile software application to an in-vehicle network; (b) configuring, in the mobile software application, a plurality of user-configurable functions, at least one first user-configurable function of said plurality of user-configurable functions being associated with at least one vehicle function of a plurality of vehicle functions that are performed exclusively by the in-vehicle network and at least one second user-configurable function of said plurality of user-configurable functions being associated with at least one operation external to the vehicle of a plurality of operations external to the vehicle that are performed exclusively by the mobile software application; and (c) activating the at least one first user-configurable function and the at least one second user-configurable function in response to a user selection of a hard key arranged within a vehicle interior.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
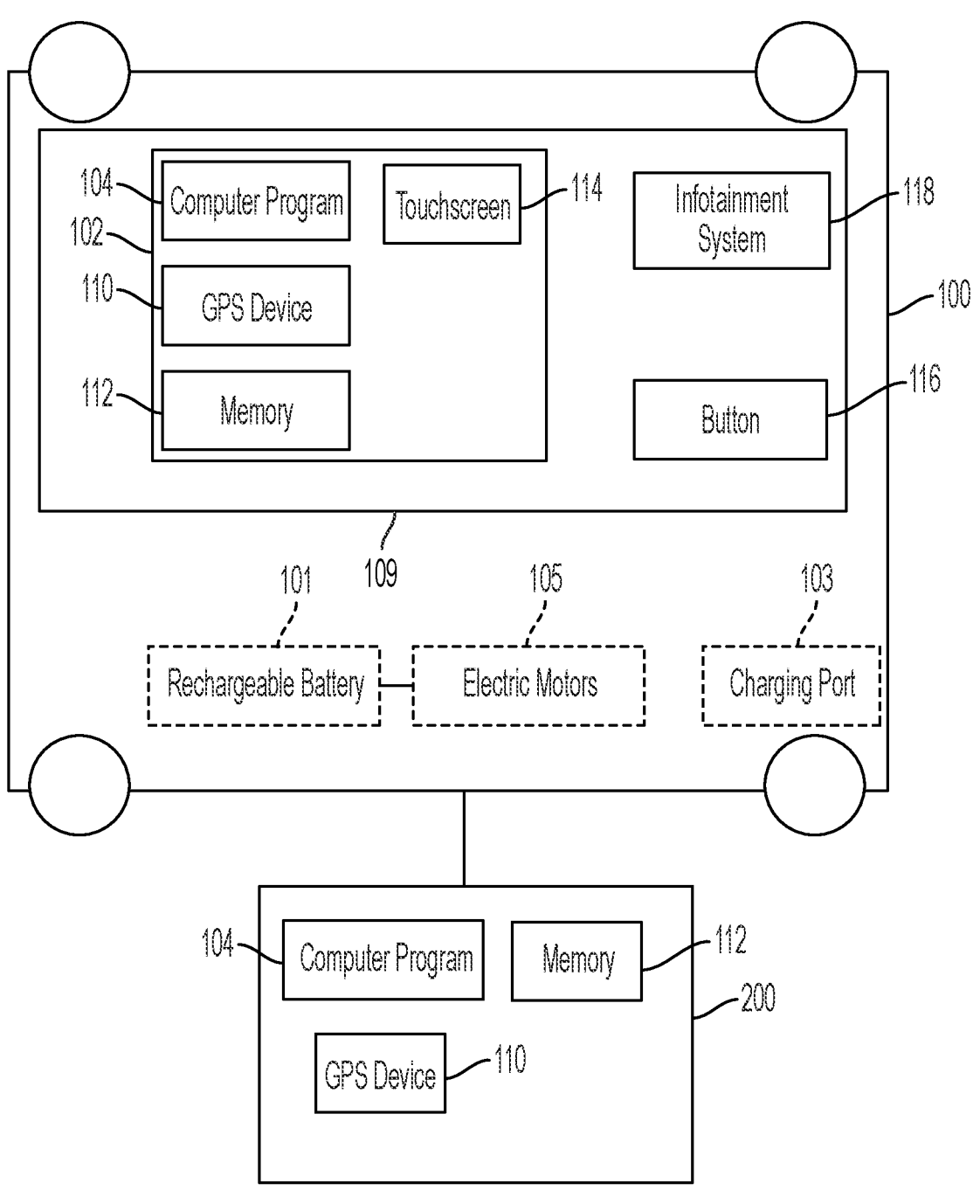
FIG. 1 depicts a schematic diagram of a vehicle and a mobile device connected to the vehicle.

FIG. 1 depicts an exemplary vehicle 100. The vehicle 100 can be an electric vehicle having a rechargeable battery 101, a charging port 103 used for charging the battery 101, and one or more electric motors 105, for example. In certain embodiments, the vehicle 100 can be an autonomous driving vehicle or a semi-autonomous driving vehicle.

Regardless of the type of vehicle 100, vehicle 100 has a computer 102 for controlling functions related to the operations of vehicle 100. An electronic mobile device 200 (otherwise referred to herein as a smartphone) is connected to vehicle computer 102 via a wired or wireless connection (e.g., Wi-Fi, cellular or Bluetooth connection). It is noted that components that are shown in broken lines in FIG. 1 are optional.

Vehicle computer 102 includes a processor, a visual display 114 having means for both inputting data and displaying data (e.g., touchscreen), and a transmitter/receiver for communicating with mobile device 200 in a conventional manner. For example, vehicle computer 102 may send and receive data via Wi-Fi or 4G/LTE radios built into vehicle 100, by way of example. Mobile device 200 includes a processor, a visual display having means for both inputting data and displaying data (e.g., touchscreen), and a transmitter/receiver for communicating with vehicle 100 in a conventional manner.

At least one physical button (i.e., hard key) 116 is arranged in the interior 109 of the vehicle 100. For example, the button 116 can be arranged on the steering wheel of the vehicle 100. Alternatively, the button 116 can be arranged on the information panel or on the center console of the vehicle 100. Although only one button 116 is illustrated in FIG. 1, several physical buttons 116 can be arranged in the interior 109 of the vehicle 100.

A computer program 104 or a software application (e.g., "app") is downloaded to, installed on, and stored in, either electronic mobile device 200 or computer 102 of vehicle 100 (or both). According to one embodiment, program 104 is stored within the mobile device 200; information can be inputted into program 104 via the display of mobile device 200; and information can be outputted from program 104 via the display of vehicle computer 102 (e.g., via Apple CarPlay or Android Auto). According to another embodiment, program 104 is stored within the vehicle computer 102; information can be inputted into program 104 via the touchscreen display 114 of vehicle computer 102; and information can be outputted from program 104 via the display of vehicle computer 102 (e.g., via Apple CarPlay or Android Auto). According to yet another embodiment, program 104 is a mobile application stored within the mobile device 200; information can be inputted into program 104 via the display of mobile device 200; and information can be outputted from program 104 via the display of mobile device 200. According to still another embodiment, program 104 is stored within the mobile device 200; information can be inputted into program 104 via the display of mobile device 200; and information can be outputted from program 104 via both the display of mobile device 200 and the display of vehicle computer 102.

Program 104 can be displayed on the touchscreen display 114 of vehicle computer 102. The functionality of program 104 can be enabled or disabled by user input on the touchscreen display 114 of vehicle computer 102.

In certain embodiments, users of the vehicle 100 may be identified by program 104 based on paired device data maintained in the memory 112 of program 104. The paired device data can indicate, for example, unique device identifiers of mobile devices that were previously paired with program 104 of the vehicle 100, such that program 104 may automatically reconnect previously connected mobile devices without user intervention.

Program 104 can be connected to receive and transmit information from/to a GPS device 110 (e.g., a GPS chip) that uses the Global Positioning System (GPS). GPS device 110 is configured to determine the location of vehicle 100 or mobile device 200 within vehicle 100 in a conventional manner. GPS device 110 may form part of vehicle computer 102 or mobile device 200, or both. This locational data can be stored in memory 112. Memory 112 may also form part of vehicle computer 102 or mobile device 200, or both.

Program 104 can be designed and configured to connect directly to the network of the vehicle 100 and/or a third-party software applications (e.g., other "apps") or devices via a direct connection application programming interface (API). For example, program 104 can be configured to interact with other apps installed on mobile device 200, such as different apps for social media, messaging, providing maps and navigation, playing music or podcasts, apps for controlling "smart" devices external to vehicle 100 (e.g., front door of a house, garage door, lights, heating or cooling, etc.), etc., that may be installed on, and be available via the display of, mobile device 200. Alternatively, program 104 can be configured to interact with other apps installed on vehicle computer 102, such as different apps for social media, messaging, providing maps and navigation, playing music or podcasts, etc., that may be installed on, and be available via the display of, vehicle computer 102 (e.g., via Apple CarPlay or Android Auto), for example. In these situations, because these apps are integrated with program 104, program 104 can use each specific app's API to perform an action specified by the user.

In certain embodiments, program 104 can appear as a selectable icon within Apple CarPlay. Program 104 can be configured to connect the network of the vehicle 100 with the Apple ecosystem (e.g., with the different Apple devices, such as iPhone, iPad, MacBook, Apple Watch, AirPods, Apple TV, Apple CarPlay, etc.) that may be connected and integrated with each other, and that may be accessible within the vehicle 100. Once connected to the Apple ecosystem, program 104 can run in the background of Apple CarPlay, for example.

The network of the vehicle 100 can include one or more of a vehicle controller area network ("CAN") or an Ethernet network, for example. The network of the vehicle 100 can allow, after proper and successful authentication, program 104 to communicate, via button 116, for example, with various systems or components of vehicle 100, such as a vehicle modem (if available), GPS device 110 and various electronic control units ("ECUs") configured to interface with program 104. For example, the vehicle ECUs may include a vehicle interior control module configured to monitor and control power control functions, such as interior lighting or window shades, for example; a radio transceiver module configured to provide radio services and communicate with mobile devices inside vehicle 100; and a climate control module configured to provide control and monitoring of heating, cooling, and ventilation system components (e.g., compressor clutch and blower fan control, temperature sensor information, etc.).

Program 104 can be configured to include different components to facilitate access to one or more features of vehicle 100 that may be provided with a default configuration by the manufactures of vehicle 100 and may be configured for changes or customization by the user of vehicle 100.

Figure 2:
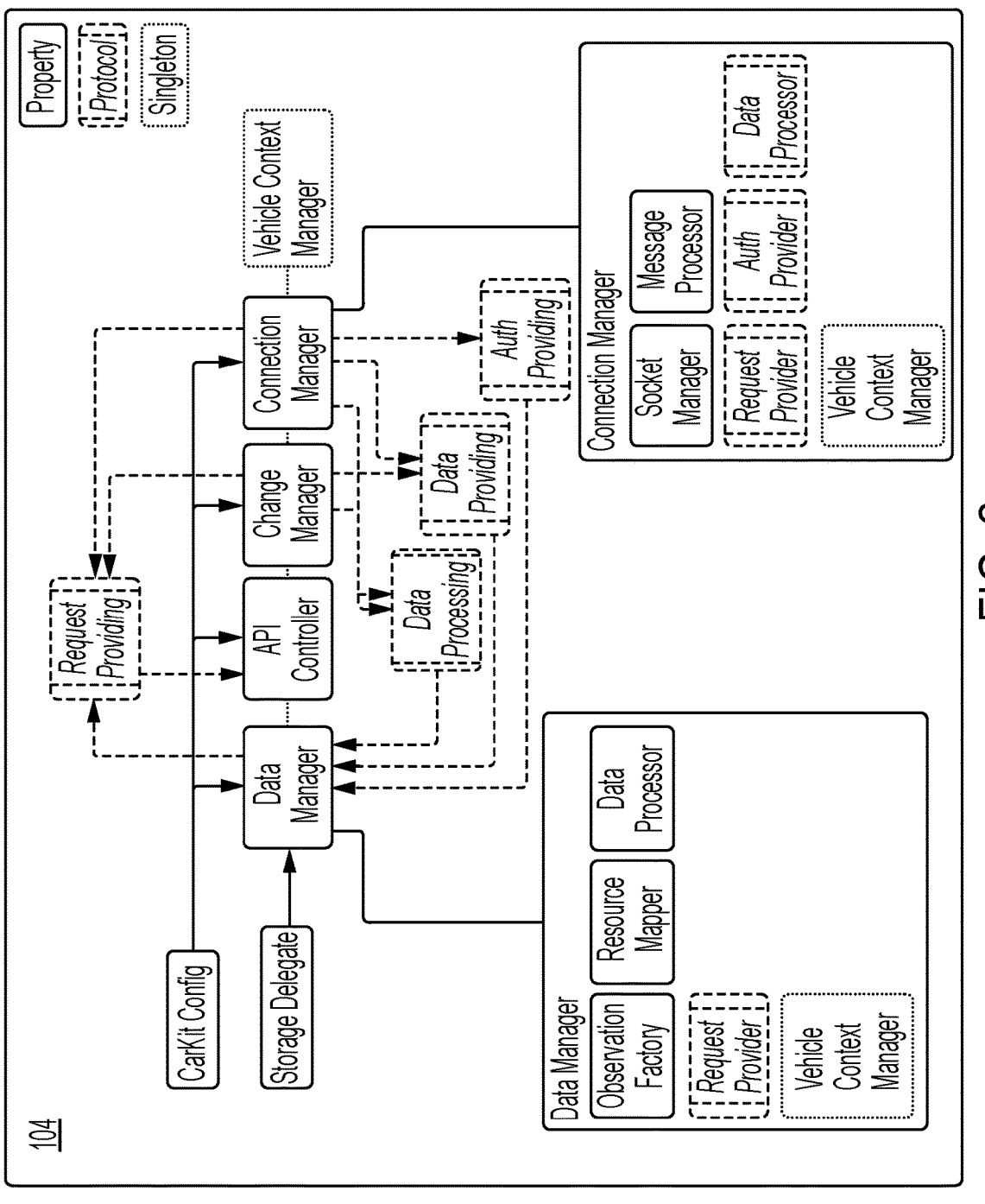
FIG. 2 is a schematic diagram of a computer program according to an embodiment.

For example, program 104 can include a Data Manager, a Connection Manager, an API Controller, and a Change Manager, as illustrated in FIG. 2, for example. It should be understood that the invention is not limited to the schematic diagram shown in FIG. 2. The schematic diagram is shown merely as an example. In FIG. 2, the Data Manager can be configured, for example, to provide, process, and update an RSI Request-Response Interface authorization and RSI resource mapping. The Connection Manager can be configured, for example, to check network conditions through a network controller, re-check connection when network conditions change, search for an infotainment web interface protocol, such as the Volkswagen Infotainment Web Interface ("VIWI") RSI service, for example, handle authentication, collect initial information (e.g., vehicle data) about different components of the vehicle 100, and process updates to vehicle data requested by the user of vehicle 100.

Program 104 can be configured to access, on the mobile device 200, a list of first user-configurable functions of the vehicle 100 associated with at least one preferred vehicle mode of a plurality of vehicle modes. The list of first user-configurable functions of the vehicle 100 can include, but is not limited to, initial or default functions of the vehicle 100, before allowing the user of vehicle 100 access to modify or customize the available first user-configurable functions of the vehicle 100. Once program 104 has gathered and parsed the initial vehicle data, program 104 can monitor for any changes to the initial vehicle data. For example, program 104 can open a WebSocket API as a two-way interactive communication session between the user's interface of program 104 and a server connected to a two-way interactive communication session between the user's browser and a server to observe, process, and store any and all changes by the user to the initial vehicle data. After the user's modifications to any of the available first user-configurable functions of the vehicle 100 are processed and stored in the memory 112 of program 104, program 104 can be configured to synchronize the modified first user-configurable functions of the vehicle 100 with the corresponding system or component of the vehicle 100.

In certain embodiments, program 104 can auto-subscribe or self-subscribe to receive a notification message for each user's modification to a user-configurable function of the vehicle 100, including but not limited to changes to elements included within a vehicle function (e.g., in the case of a complex, compound vehicle function related to more than one setting of a vehicle component or to multiple settings of multiple vehicle components), in addition to changes to the function of the vehicle 100 itself. For example, when the user's modification relates to a vehicle function affecting climate or ventilation control in the interior 109 of the vehicle 100, program 104 can be configured to be notified when any of the fan settings or the temperature values has been changed by the user.

In addition, program 104 can be configured to auto detect any smart devices (e.g., smart phones, smart watches, tablets, etc.) that are compatible with program 104, and that may be accessible within the vehicle 100, and auto connect with these devices as soon as they are set up, without the necessity for the user to set up these devices each time. As another example, program 104 can connect to a smart device via a direct connection application programming interface (API).

Program 104 can be configured to access, on the mobile device 200, a list of second user-configurable functions of the mobile device 200 associated with an operation external to the vehicle 100 that is performed by program 104. The list of second user-configurable functions of the mobile device 200 can include, but is not limited to, initial or default functions of the mobile device 200, before allowing the user of mobile device 200 access to modify or customize the available user-configurable functions of the mobile device 200. Once program 104 has gathered and parsed the initial mobile device data, program 104 can monitor for any changes to the initial mobile device data. For example, program 104 can open a WebSocket API as a two-way interactive communication session between the user's interface of program 104 and a server connected to a two-way interactive communication session between the user's browser and a server to observe, process, and store any and all changes by the user to the initial mobile device data. After the user's modifications to any of the available user-configurable functions of the mobile device 200 are processed and stored in the memory 112 of program 104, program 104 can be configured to synchronize the modified user-configurable functions of the mobile device 200 with the corresponding external system or component controlled by the mobile device 200.

Program 104 can aggregate vehicle data obtained from the vehicle network and the vehicle systems with mobile device data obtained from the mobile device 200 network and external systems or components controlled by the mobile device 200, and offer to the user combinations for simultaneously (e.g., at the same time) controlling or adjusting vehicle functions and mobile device functions that do not necessarily share a specific attribute by controlling different in-vehicle systems and components (e.g., lighting, climate, ventilation, radio, sound system, etc.) and different external systems or components controlled by the mobile device 200, with the press of a single button 116, for example. As a specific example, the user may utilize button 116 and program 104 running on smartphone 200 or on vehicle computer 102 to simultaneously adjust multiple vehicle-related settings related to ambient lighting, cabin temperature, user of the vehicle 100, settings related to lowering the cabin temperature, cabin ventilation, or playing a custom audio soundtrack on the sound system of the vehicle 100, as well as multiple mobile device-related settings associated with an operation external to the vehicle that is performed by the software application. Examples of mobile device-related settings associated with an operation external to the vehicle that is performed by the software application 104 can include, but are not limited to, locking or unlocking a house front door, checking whether the house front door is locked, opening or closing a garage door, turning on or off house lights, house heating or cooling systems, or house security or alarm systems, and sending a pre-set text message by the user to an external party (e.g., "On my way" to friend or relative, etc.).

Program 104 can be configured to associate the button 116 with a subset of the simultaneously controlled user-configurable vehicle and external functions (e.g., lighting, climate, ventilation, radio, sound system, locking or unlocking a house front door, checking whether the house front door is locked, opening or closing a garage door, turning on or off house lights, house heating or cooling systems, or house security or alarm systems, and sending a pre-set text message, etc.). The button 116 can be associated with at least one preferred vehicle mode (e.g., sports mode) among a plurality of vehicle modes.

In certain embodiments, multiple buttons 116 can be arranged within the vehicle interior 109. Each of the buttons 116 can be associated, in program 104, with a corresponding subset of the simultaneously controlled user-configurable vehicle and external functions (e.g., lighting, climate, ventilation, radio, sound system, locking or unlocking a house front door, checking whether the house front door is locked, opening or closing a garage door, turning on or off house lights, house heating or cooling systems, or house security or alarm systems, and sending a pre-set text message, etc.). Each button 116 can be associated with a different vehicle mode (e.g., sports mode, mountain mode, snow mode, etc.) among a plurality of vehicle modes.

Program 104 can be configured to connect to various interconnected smart devices located in the user's home and/or in vehicle 100 either directly or through various aggregators, hubs (e.g., HomeKit, Samsung SmartThings), and connectors (e.g., Yonomi), for example. These aggregators, hubs, and connectors allow the user to select one or more connected devices through aggregation of the data (e.g., application and/or device information). Initially, each aggregator, hub, or connector may prompt the user to log into devices through applications into applications, such as accounts, logins, or the like that are relevant to one or more selected-by-the-user devices. In other words, program 104 can provide the user with the ability to add devices across a number of hubs or aggregators, such as SmartThings, Yonomi, HomeKit, etc., or directly to a third-party app or device via a direct connection application programming interface (API).

The button 116 can be programmed to work with program 104, as well as across a number of third party apps, as such apps become available. For example, an applet such as If This Then That (IFTTT), Canon/Nikon for remote camera control, as well as any app with a button-press function to trigger an action, can be programmed on the button 116 if the user has access to the API of the third party app. For example, the button 116 can be programmed to access Nexx Home to control Nexx Home smart garage doors and other Nexx home devices through the respective app.

The vehicle-related settings and the mobile device-related settings can be associated with at least one preferred vehicle mode, such as sports mode, for example, of a plurality of vehicle modes. Specifically, the vehicle interface (e.g., VIWI) can facilitate the ability to issue one command via a single push of button 116 (e.g., "sports mode") based on the user's request to simultaneously control multiple in-vehicle systems and components (e.g., window shades, temperature, air ventilation direction, currently playing soundtrack, etc.) and multiple mobile device-related settings (e.g., locking a house front door, checking whether the house front door is locked, or sending a pre-set text message to an external party). The multiple in-vehicle systems and components control requests are terminated in different ECUs in the vehicle (e.g., climate controller for temperature, audio system for soundtrack, etc.). The multiple external to the vehicle control requests are terminated in different ECUs of the controlled, by the mobile device 200, external systems or components (e.g., locks of house front door, status of garage door, house lights, house heating or cooling systems, or house security or alarm systems, pre-set text messages, etc.).

Program 104 can be configured to allow the user to access and change which, or how many of, the first user-configurable functions that are associated with a preferred vehicle mode of a plurality of vehicle modes and which, or how many of, the second user-configurable functions that are associated with an operation external to the vehicle that is performed by the software application can be included in each set of the plurality of user-configurable functions. The user can configure, e.g., in advance, in the program 104, on the mobile device 200, multiple user-configurable functions using the user interface of the program 104. For example, the user can configure in, and save in the memory 112 of, the program 104 a plurality of user-configurable functions, each of which can be associated with a preferred vehicle mode (e.g., sports mode) of a plurality of vehicle modes.

After the user's modifications to any of the available user-configurable functions are processed and stored in the memory 112 of program 104, program 104 can be configured to synchronize the modified user-configurable functions with the corresponding vehicle system or external system controlled by the mobile device 200.

Figure 3:
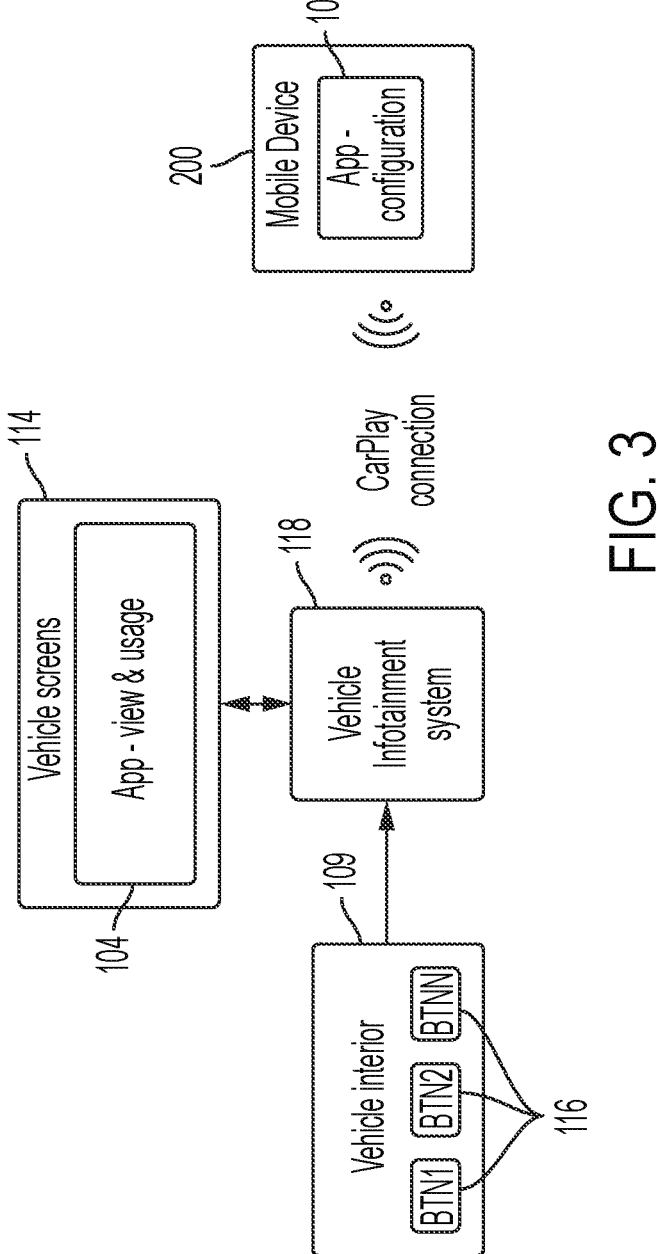
FIG. 3 depicts a schematic diagram of a system including a vehicle and a mobile device for simultaneously controlling vehicle functions and mobile device functions.

FIG. 3 depicts the interaction between mobile device 200 and the vehicle 100. Mobile device 200 communicates with vehicle infotainment system 118 (or other system) of vehicle 100 via CarPlay or other system. Vehicle infotainment system 118 includes the smartphone mirroring app (e.g., CarPlay). CarPlay (for example) mirrors the mobile device 200 apps on the display or touchscreen 114 of vehicle 100. As is described in U.S. patent application Ser. No. 18/219, 933, which is incorporated by reference herein in its entirety, vehicle functions (e.g., vehicle audio and video, vehicle window control, climate control, vehicle lighting, etc.) are integrated within the CarPlay app to create an innovate, personalized experience for the vehicle driver and passengers. Accordingly, the driver and passengers can control various in-vehicle functions via a connected smartphone because the smartphone is connected to the in-vehicle Car-Play app, the CarPlay app is integrated within the vehicle infotainment system 118, and the vehicle infotainment system 118 is interconnected with the in-vehicle network of controllers, sensors and computers.

Vehicle infotainment system 118 is also connected to one or more in-vehicle hard keys or buttons 116. Depressing button 116 causes program 104 to (i) activate one or more in-vehicle functions (e.g., activate vehicle seat heaters, activate vehicle sport mode, etc.) and (ii) cause one or more apps in mobile device 200 to perform functions external to the vehicle (e.g., send text message, lock house door, etc.). This can be accomplished because the mobile device 200 is connected to the vehicle infotainment system 118.

Figure 4:
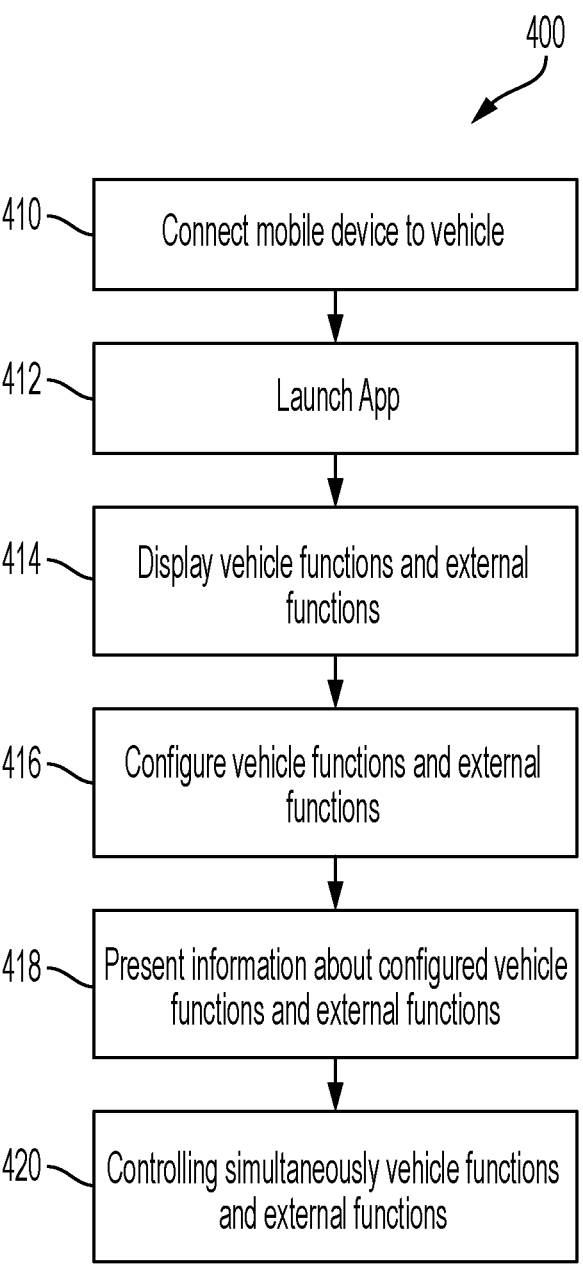
FIG. 4 is a flowchart depicting an overall method for simultaneously controlling vehicle functions and mobile device functions.

FIG. 4 is a flowchart depicting an overall method 400 for simultaneously controlling vehicle functions and mobile device functions. It is noted at the outset that the method 400 is not limited to any particular step or order of steps, and various steps may be omitted or modified within the scope or spirit of the invention. The user of the vehicle 100 can be a driver of the vehicle 100 or a passenger in the vehicle 100.

It is also noted that method 400 uses mobile device 200 along with vehicle 100 to accomplish method 400, however, it should be understood that vehicle computer 102 of vehicle 100 may be omitted and the steps of method 400 may be completed using only mobile device 200. Alternatively, mobile device 200 may be omitted and the steps of method 400 may be completed using only vehicle computer 102 of vehicle 100.

At step 410 of method 400, mobile device 200 connects to vehicle 100 in either a wired or wireless manner, as described above. If the steps of method 400 are completed by vehicle 100 itself (and without the assistance of mobile device 200), then this step may be omitted.

Optionally, after the connection between the mobile device 200 and the vehicle 100 is established, program 104 can initiate an authentication of the mobile device 200 and/or the vehicle 100. The authentication can be performed using known methods, such as Transport Layer Security ("TLS") 1.2 security protocol, public pinning hash, local certificate pinning, PIN numbers that can be entered by the user or QR codes that can be scanned by the mobile device 200, for example. Further functionality of program 104 can be disabled until after the mobile device 200 and/or the vehicle 100 successfully complete the authentication process (e.g., the mobile device 200 confirms that the saved user and vehicle information is stored in the vehicle 100).

At step 412, the user (e.g., driver or passenger of vehicle 100) launches program 104 on mobile device 200 or on vehicle computer 102. Step 412 may occur either prior to a vehicle trip or during the vehicle trip.

At step 414, program 104 displays one or more in-vehicle functions associated with at least one preferred vehicle mode of a plurality of vehicle modes of vehicle 100 and one or more external functions associated with an operation external to vehicle 100 performed by the program 104. The in-vehicle functions can include, but are not limited to, activating a vehicle sport mode, controlling vehicle window shades, lighting, climate, ventilation, radio, sound system, etc., for example. The external functions can include, but are not limited to, locking or unlocking a house front door, checking whether the house front door is locked, opening or closing a garage door, turning on or off house lights, house heating or cooling systems, or house security or alarm systems, and sending a pre-set text message by the user to an external party (e.g., "On my way" to friend or relative, etc.), for example.

The vehicle functions and the external functions may be saved in the memory 112 of the mobile device 200 or vehicle computer 102, for example.

Before displaying, to the user, the internal listing of vehicle functions and external functions in step 414, the listing may be sorted, arranged and organized in a certain fashion. As one example for sorting the listing, program 104 checks for the most recently used or the most often used vehicle function(s) and external function(s), and automatically organizes the vehicle function(s) and the external function(s) such that the most recently used or the most often used vehicle function(s) and external function(s) appear at the top of the list.

As another example, program 104 can recognize the user of the vehicle 100 (e.g., in case multiple users use the same vehicle 100) and can automatically display the vehicle functions and external functions that were most recently used or are most often used by the recognized user.

At step 416, program 104 receives from the user (e.g., driver or passenger) of the vehicle 100 user input configuring, in program 104, at least one vehicle function and at least one external function among the vehicle functions and the external functions that were displayed to the user at step 414. The at least one vehicle function can be associated with at least one preferred vehicle mode (e.g., "sport mode") of a plurality of vehicle modes and can include multiple vehicle-related settings related to ambient lighting, cabin temperature, user of the vehicle 100, settings related to lowering the cabin temperature, cabin ventilation, seat massage, seat ventilation, or playing a custom audio soundtrack on the sound system of the vehicle 100. The at least one external function can be associated with an operation external to the vehicle (e.g., locking or unlocking a house front door, checking whether the house front door is locked, opening or closing a garage door, turning on or off house lights, house heating or cooling systems, or house security or alarm systems, and sending a pre-set text message by the user to an external party, etc.) that is performed by the program 104. The user input in step 416 of configuring, in program 104, at least one vehicle function and at least one external function, can be in the form of the user selecting an icon or pressing a button on the touchscreen of the mobile device 200 within the user interface of program 104. Alternatively, the user input can be in the form of a voice command by the user over an audio system of the mobile device 200. In certain embodiments, for example, Apple Siri can be expanded to enable user input, selection, and modification of vehicle functions and external functions through the program 104.

The user's selection can be saved in memory 112 of mobile device 200 for either current use or later use. The user's selection saved in memory 112 is made available for use by program 104. Once saved, the saved vehicle functions and the external functions may be presented to the user as selectable icons (e.g., icons named "sports mode," etc.), for example, on the display of mobile device 200 or vehicle computer 102. Each icon may be in the form of a single softkey button on the display and within the user interface of program 104, for example.

In certain embodiments, program 104 can receive from the user (e.g., driver or passenger) of the vehicle 100 user input selecting a category or a type of the vehicle functions and the external functions that the user is interested in controlling or adjusting, such as vehicle-related settings related to ambient lighting, cabin temperature, user of the vehicle 100, settings related to lowering the cabin temperature, cabin ventilation, seat massage, seat ventilation, or playing a custom audio soundtrack on the sound system of the vehicle 100, as well as mobile device-related settings associated with an operation external to the vehicle that is performed by the software application (e.g., locking or unlocking a house front door, checking whether the house front door is locked, opening or closing a garage door, turning on or off house lights, house heating or cooling systems, or house security or alarm systems, and sending a pre-set text message by the user to an external party, etc.), for example.

Turning back to FIG. 4, at step 418, program 104 presents the information about the configured vehicle functions and external functions to the user of the vehicle 100 (e.g., driver, passengers). For example, the information about the configured vehicle functions and external functions can be presented to the user via the touchscreen display of the mobile device 200. Alternatively, the information about the configured vehicle functions and external functions can be presented to the user via the touchscreen display 114 of vehicle computer 102 (e.g., via Apple CarPlay or Android Auto) of the vehicle 100. Alternatively, the information about the configured vehicle functions and external functions can be presented to the user via a Text-to-Speech ("TTS") technology over the audio system of the vehicle 100.

Step 418 of presenting to the user the information about the configured vehicle functions and external functions can include, for example, vehicle features and ecosystem features grouped in three main categories: a default category of actions called essentials, for example, including daily or most used features, quick actions (allowing the user to select and configure quick actions from a predetermined list of features), and specialty actions, such as entertainment (for media), for example. For example, the daily features can include radio favorites, vehicle climate modes, vehicle air distribution, destinations, weather, air quality index (AQI), music, etc.

In certain embodiments, program 104 can aggregate vehicle data obtained from the vehicle network and the vehicle systems and offer to the user combinations for controlling or adjusting vehicle functions that share a specific attribute by controlling a certain in-vehicle component (e.g., lighting, climate, ventilation, radio, sound system, etc.). As a specific example, the user may utilize program 104 running on smartphone 200 to turn on all vehicle interior lights, but at a low intensity level.

In other embodiments, program 104 can aggregate external components and systems data obtained from external systems or components controlled by the mobile device 200, and offer to the user combinations for controlling or adjusting external functions that share a specific attribute by controlling a certain external system or component (e.g., lighting, etc.). As a specific example, the user may utilize program 104 running on smartphone 200 to turn on all house interior lights, but at a low intensity level.

In other embodiments, program 104 can aggregate vehicle data obtained from the vehicle network and the vehicle systems, and the external components and systems, and offer to the user combinations for controlling or adjusting vehicle functions and external functions that do not necessarily share a specific attribute by controlling different in-vehicle systems and components (e.g., lighting, climate, ventilation, radio, sound system, locks, security system, garage door, lighting, climate, ventilation, sound system, etc.) at the same time, with the press of a single button 116 or with a selection of a single icon, for example. As a specific example, the user may utilize program 104 running on smartphone 200 to adjust multiple settings related to vehicle ambient lighting, cabin temperature, user of the vehicle 100, settings related to lowering the cabin temperature, cabin ventilation, seat massage, seat ventilation, or playing a custom audio soundtrack on the sound system of the vehicle 100 and external systems settings, such as locking or unlocking a house front door, checking whether the house front door is locked, opening or closing a garage door, turning on or off house lights, house heating or cooling systems, or house security or alarm systems, and sending a pre-set text message by the user to an external party, for example. Specifically, the vehicle interface (e.g., VIWI) can facilitate the user's ability to issue one command via a single push of button 116 (e.g., "sports mode") based on the user's request to simultaneously control multiple in-vehicle systems and components (e.g., seat massage, temperature, air ventilation direction, currently playing soundtrack, etc.) and external systems or components controlled by the mobile device 200 (e.g., house door lock, garage door status, house security system, etc.). These multiple control requests are terminated in different ECUs in the vehicle (e.g., seat controller for massage, audio system for soundtrack, etc.) or in different ECUs of the controlled, by the mobile device 200, external systems or components (e.g., locks of house front door, status of garage door, house lights, house heating or cooling systems, or house security or alarm systems, pre-set text messages, etc.).

Regardless of the type or category of the configured vehicle functions and external functions, the displayed information about the configured vehicle functions and external functions is contextually relevant in-vehicle information and contextually local vehicle function information, as well as contextually relevant external systems or components information for the audience in the vehicle 100 (e.g., driver, passengers).

Turning back to FIG. 4, in order to present the information about the configured vehicle functions and external functions to the user of the vehicle 100 (e.g., driver, passengers) in step 418, program 104 accesses the network of the vehicle 100 and external systems or components controlled by the mobile device 200, and obtains in-vehicle data and external systems or components data related to the configured, by the user, vehicle functions and external functions.

At step 420, program 104 can receive from the user (e.g., driver or passenger) of the vehicle 100 user input simultaneously controlling, by the user of the vehicle 100, the configured vehicle functions and external functions. As described above, the user input can be in the form of the user pressing button 116 arranged within the vehicle interior 109. Alternatively, the user input can be in the form of the user selecting an icon on the touchscreen 114 of vehicle computer 102. Alternatively, the user input can be in the form of a voice command by the user over an audio system of the vehicle 100. According to this embodiment, the user selection is accomplished using the input device (e.g., touch screen, stylus, mouse pad, keyboard, etc.) of vehicle 100, however, it should be understood that the selection could be accomplished using the input device (e.g., touch screen) of mobile device 200.

Because settings related to the vehicle functions and the external functions can be pre-defined or pre-programmed and saved in the memory of mobile device 200 or vehicle computer 102, multiple adjustable vehicle function settings and external function settings can be controlled and adjusted with one press by the user of button 116 on the steering wheel or dashboard of the vehicle 100, or on the touchscreen 114 of the vehicle 100.

It should be understood that method 400 is not limited to any particular step or sequence of steps.

The available user-configurable functions can be personalized to the specific user's preferences and can be adjusted according to predefined options. Alternatively, the user can adjust the predefined options to further suit the user's preferences.

The step of personalizing the selected user-configurable functions based on the user's preferences can be executed by program 104 running on the smartphone 200, in real time between the smartphone 200 and the infotainment system 118 of the vehicle 100.

In certain embodiments, step 418 of presenting to the user the information about the selected vehicle function can include, for example, a step of accessing the vehicle network and obtaining vehicle data related to the selected vehicle function of the vehicle 100.

It should be understood that method 400 is not limited to the particular examples of vehicle and external functions described herein. For example, method 400 can be applied in a similar manner to present information to the user of vehicle 100 and enable control of a vehicle-related function or external function, or anything related to the in-vehicle user's experience, such as a current street the vehicle 100 is driving on, the current city or area the vehicle 100 is driving through, currently playing music, news, or podcasts, etc. The information can be conveniently presented to the user via the touchscreen 114 of the vehicle 100 or via text-to-speech technology, using Apple CarPlay, Android Auto, Microsoft SYNC, or over the vehicle audio system, for example. In other words, the steps of method 400 can be used to enhance the in-vehicle user's experience with any of the vehicle systems or software apps that are installed and running on vehicle's computer 102 or on a mobile device 200 connected to vehicle 100.

Also, although it has been described that program 104 on mobile device 200 performs the steps described herein, it should be understood that program 104 on vehicle computer 102 may perform these steps in lieu of mobile device 200.

In the context of the present description, the functions of program 104 may be carried out by a processor. The processor can be understood to mean a machine or an electronic circuit, for example. In particular, a processor can be a central processing unit (CPU), a microprocessor or microcontroller, for example an application-specific integrated circuit or digital signal processor, possibly in combination with a data storage unit for storing program commands, etc. Additionally, a processor can be understood to be a virtual processor, a virtual machine or soft CPU. The program 104 may be stored in the memory of the machine.

It will be understood that the operational steps are performed by the computers or processors described herein upon loading and executing software code or instructions which are tangibly stored on a tangible, non-transitory computer readable storage medium, such as on a magnetic medium, e.g., a computer hard drive, an optical medium, e.g., an optical disc, solid-state memory, e.g., flash memory, or other storage media known in the art. Thus, any of the functionality performed by the computers or processors described herein described herein is implemented in software code or instructions which are tangibly stored on a tangible, non-transitory computer readable storage medium. Upon loading and executing such software code or instructions by the computers or processors, the computers or processors may perform any of the functionality of the computers or processors described herein, including any steps of the methods described herein.

The term "software code" or "code" used herein refers to any instructions or set of instructions that influence the operation of computers or processors. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

It will also be understood that the terms and expressions used herein have the ordinary meaning as is accorded to such terms and expressions with respect to their corresponding respective areas of inquiry and study except where specific meanings have otherwise been set forth herein. The terms "comprises," "comprising," "includes," "including," or any other variation thereof, are intended to cover a non-exclusive inclusion, such that a process, method, article, or apparatus that has, comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A computer-implemented method for simultaneously controlling vehicle functions and mobile device functions, said method comprising:
   (a) connecting a mobile software application to an in-vehicle network;
   (b) configuring, in the mobile software application, a plurality of user-configurable functions, at least one first user-configurable function of said plurality of user-configurable functions being associated with at least one vehicle function of a plurality of vehicle functions that are performed exclusively by the in-vehicle network and at least one second user-configurable function of said plurality of user-configurable functions being associated with at least one operation external to the vehicle of a plurality of operations external to the vehicle; and
   (c) activating the at least one first user-configurable function and the at least one second user-configurable function in response to a single user selection of a hard key that is arranged within a vehicle interior and connected to the in-vehicle network.

2. The computer-implemented method of claim 1, wherein the plurality of vehicle functions comprise at least two of activating a sports mode, controlling vehicle window shades, controlling vehicle windows, and controlling a vehicle heating or climate control system, and wherein the plurality of operations external to the vehicle comprise at least two locking a house front door, checking whether the house front door is locked, opening or closing a garage door, and sending a text message to an external party by the user.

3. The computer-implemented method of claim 1, wherein the mobile software application is installed on a mobile device and the configuring in the mobile software application of the plurality of user-configurable functions is performed on the mobile device.

4. The computer-implemented method of claim 1, further comprising associating, in the mobile software application, the hard key with at least one subset of said plurality of user-configurable functions.

5. The computer-implemented method of claim 1, wherein a plurality of hard keys are arranged within the vehicle interior and the method further comprises associating, in the mobile software application, each hard key of said plurality of hard keys with different subsets of said plurality of user-configurable functions.

6. The computer-implemented method of claim 5, wherein each hard key of said plurality of hard keys is associated with different vehicle functions among the plurality of vehicle functions.

7. The computer-implemented method of claim 1, further comprising displaying the mobile software application on a screen of the vehicle.

8. The computer-implemented method of claim 7, further comprising one of enabling or disabling of the mobile software application on the screen of the vehicle.

9. The computer-implemented method of claim 1, wherein the configuring in the mobile software application of the plurality of user-configurable functions is performed on a mobile device and the activating step is performed based on a control signal from the mobile software application in response to selection of the hard key.

10. The computer-implemented method of claim 9, wherein the controlling each of the plurality of user-configurable functions simultaneously is performed by the mobile software application via a vehicle network application programming interface (API).

11. A computer program product for simultaneously controlling vehicle and non-vehicle functions, the computer program product being stored in a non-transitory computer-readable recording medium, wherein the computer program product is configured for: activating a plurality of user-configurable functions, at least one first user-configurable function of said plurality of user-configurable functions being associated with at least one vehicle function of a plurality of vehicle functions that are performed exclusively by an in-vehicle network and at least one second user-configurable function of said plurality of user-configurable functions being associated with at least one operation external to the vehicle of a plurality of operations external to the vehicle in response to a single user selection of a hard key that is arranged within a vehicle interior and connected to the in-vehicle network.

12. A vehicle comprising the computer program product of claim 11.

13. A smartphone comprising the computer program product of claim 11.

* * * * *